Oct. 25, 1927.

G. McCALL 1,646,759

ELEVATING DEVICE

Filed May 22, 1926

Inventor
GEORGE McCALL
By his Attorneys
Redding, Greeley, O'Shea + Campbell

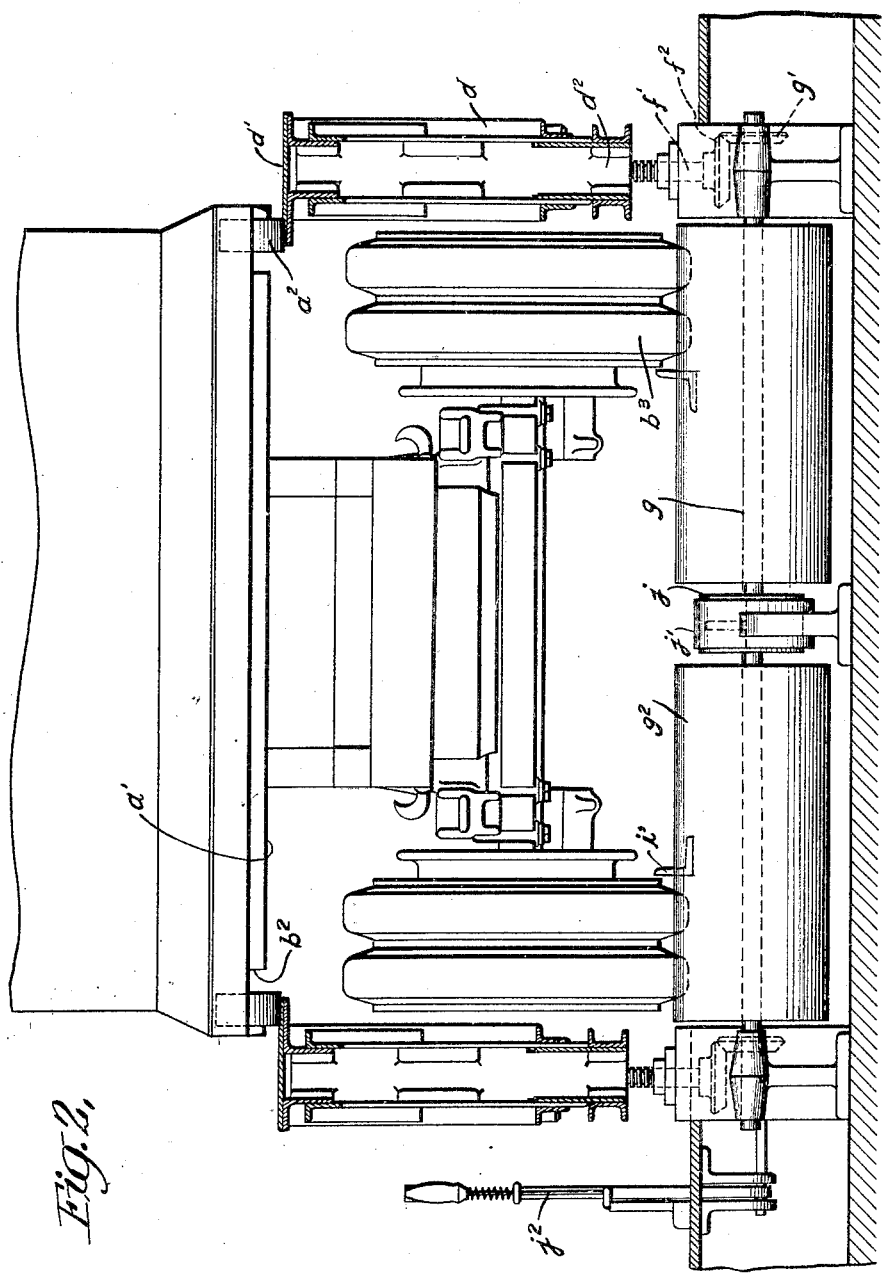

Patented Oct. 25, 1927.

1,646,759

UNITED STATES PATENT OFFICE.

GEORGE McCALL, OF WOODSIDE, NEW YORK, ASSIGNOR TO INTERNATIONAL MOTOR COMPANY, OF NEW YORK, N. Y., A CORPORATION OF DELAWARE.

ELEVATING DEVICE.

Application filed May 22, 1926. Serial No. 110,909.

It is generally considered that the most efficient way to transport merchandise in quantity, intended for a single destination, is in a container of a size sufficient to hold the entire shipment and capable of being loaded onto and off a truck and of being transported thereby in its entirety. The loading and unloading of these large and somewhat unwieldy containers between motor trucks and, say, warehouse platforms presents a problem which the present invention seeks to solve. Generally the container is provided with wheels over which it may travel, but which afford an insecure footing for the container on a moving truck. Therefore, the truck platform is made of such width as to permit the disposition of the wheels outwardly thereof and the container bottom rests solidly on the platform. Further, warehouse platforms are not of a uniform height and are often higher than the truck platform, which is maintained as low as possible in the interest of stability. Cranes have been resorted to, to lift the container from its resting place and deposit it in a new one, but such an expedient, while satisfactory in its operation, necessitates the provision of expensive equipment occupying valuable space capable of devotion to other purposes. According to the present invention, it is proposed to provide elevating devices adjacent the sides of the truck, operable, if desired, from the truck prime mover, to raise the container off the truck platform to the necessary level and afford a runway for the wheels whereby the container may be rolled off onto a platform. More particularly, the truck carrying a container, is backed between a pair of the elevators so that its driving wheels rest upon rolls, operatively connected with jacks or the like, for raising the elevators when the driving wheels turn. Of course, a reversal of the operation of the device will permit the transfer of a container from a platform to a truck.

In order that the invention may be clearly understood and readily carried into effect, the same will now be described more fully with reference to the accompanying drawings, illustrating a preferred embodiment thereof, in which:

Figure 2 is a view taken in the planes indicated by the lines 2—2 in Figure 1, looking in the direction of the arrows, and showing particularly the actuating mechanism for the elevating devices and the manner in which the driving wheels are availed of to furnish the motive power.

Figure 1:
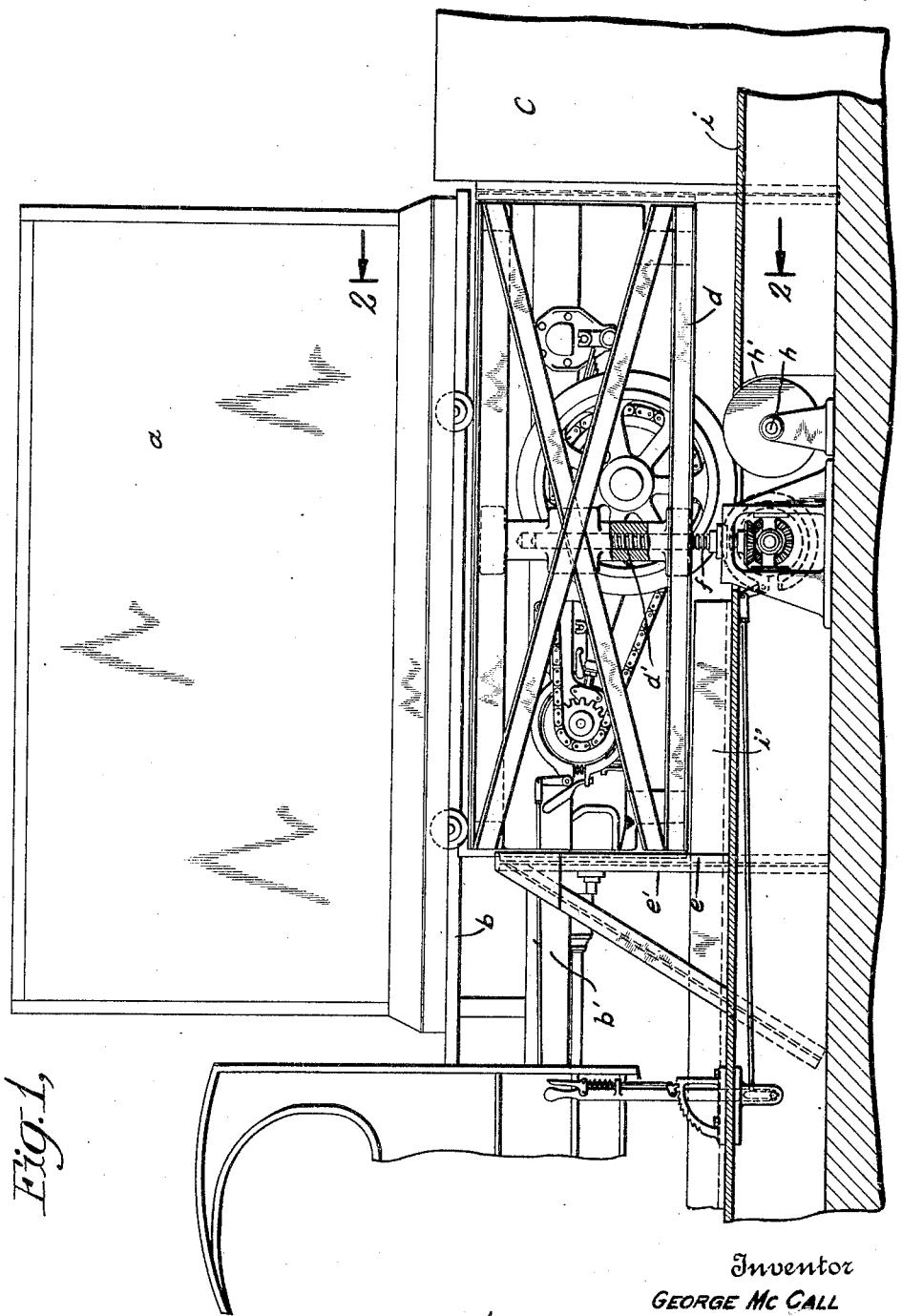
Figure 1 is a view in side elevation of the elevating mechanism according to the present invention about to raise a wheeled container off a truck and elevate it to the level of a platform so that it can be rolled off the elevator thereonto.

In order that the container $a$ may rest, in a stable manner, upon the platform $b$ of the truck or other conveyance $b'$, the platform is of such width as to permit the bottom $a'$ of the container to bear upon the platform with the wheels $a^2$ disposed outwardly of the lateral edges $b^2$. The simplest manner of transferring the container $a$ between the truck $b'$ and a platform $c$ is by its own wheels $a^2$ and the present invention is concerned with devices permitting such transfer to be effected. Accordingly the truck $b$ is backed between a pair of frames $d$ disposed in a direction perpendicular to the platform $c$ and provided at their tops with runways $d'$ of a width sufficient to afford clearance for the truck, but to engage the wheels of the container upon being raised. If desired, the wheels may be guided by angle irons $i'$ parallel with the frames and resting on the roadway. The frames are slidable in trackways $e$ formed in uprights posts $e'$ and are reciprocated by screws or threaded male members $f$ carried on the vertical shafts $f'$ and entering threaded female members $d^2$ secured to the frames. Thus, when the truck is in position between the frames and the shafts $f'$ are rotated, the frames $d$ will be raised so that the runways $d'$ engage the wheels and lift the container out of contact with the platform. The elevating of the frames is continued until the runways are on a level with the platform $c$ when the container can be rolled off thereonto.

The reciprocation of the frames must be synchronized, as is obvious, and to this end the shafts $f'$ are turned by a common shaft $g$ transverse to the median line of the truck through the intermeshing bevel pinions $f^2$, $g'$ carried respectively by the vertical shafts $f'$ and the transverse shaft $g$.

Various means may be adopted for rotating the transverse shaft $g$ and hence the vertical shafts $f'$ but probably the most convenient and most economical way will be the utilization of the prime mover of the vehicle as the motive power. To this end the transverse shaft $g$ carries rolls $g^2$ and a parallel idler shaft $h$ also carries similar rolls $h'$ both projecting slightly above the roadway $i$ and so placed that when the truck is backed into position its driving wheels $b^3$ will be supported thereon. In this position, if the wheels continue to turn, the rolls will turn and with them the transverse shaft. Rotation of this shaft will effect the reciprocation of the elevators dependent upon the direction of rotation of the wheels. To permit the wheels to climb on and off the rolls the transverse shaft $g$ may carry a brake drum $j$ engaged by a brake band $j'$ operated by the lever $j^2$ disposed forwardly where it may be conveniently grasped by the operator of the vehicle.

Thus, it will be seen, that a convenient, simple and inexpensive elevating runway has been provided, which will lift a container off the platform of a vehicle and over which it may be rolled in transfer to a platform or the like and the motive power for the reciprocation of the runway may, if desired, be the prime mover of the vehicle. Of course, by suitably proportioning the gearing the rate of reciprocation or the elevating force may be varied as required.

Various modifications may be made in the configuration and manner of actuation of the several instrumentalities combined to form the elevating device as illustrated and described and certain of the features are capable of independent use without departing from the spirit and scope of the invention.

What I claim is:

1. The combination with a vehicle, and a wheeled container to be carried by the vehicle, of elevating devices between which the vehicle is disposed comprising frames carrying runways and formed with inwardly threaded female members, vertical threaded shafts meshing with the female members, a transverse shaft, operative connections between the transverse shaft and the vertical shafts, a roll carried with the transverse shaft, and an idler roll adjacent thereto.

2. The combination with a vehicle, and a wheeled container to be carried by the vehicle, of elevating devices between which the vehicle is disposed comprising frames carrying runways and formed with inwardly threaded female members, vertical threaded shafts meshing with the female members, a transverse shaft, operative connections between the transverse shaft and the vertical shafts, a roll carried with the transverse shaft, an idler roll adjacent thereto, and braking devices for the transverse shaft.

This specification signed this 19th day of May, A. D. 1926.

GEORGE McCALL.